United States Patent [19]

McGuiggan et al.

[11] 4,447,409
[45] May 8, 1984

[54] PROCESS FOR THE PRODUCTION OF HYDROGEN AND CARBONYL SULFIDE FROM HYDROGEN SULFIDE AND CARBON MONOXIDE USING A METAL BORIDE, NITRIDE, CARBIDE AND/OR SILICIDE CATALYST

[75] Inventors: Michael F. McGuiggan, Shaker Heights; Philip L. Kuch, Aurora, both of Ohio

[73] Assignee: The Standard Oil Company, Cleveland, Ohio

[21] Appl. No.: 448,580

[22] Filed: Dec. 10, 1982

[51] Int. Cl.$^3$ .................. C01B 31/26; C01B 1/03
[52] U.S. Cl. ........................... 423/416; 423/648 R
[58] Field of Search .................... 423/416, 648 R

[56] References Cited

U.S. PATENT DOCUMENTS

| | | |
|---|---|---|
| 964,415 | 7/1910 | Frank .......................... 423/648 R |
| 2,809,097 | 10/1957 | Adcock et al. ................. 423/416 |
| 2,983,580 | 5/1961 | Kerr ................................ 423/416 |
| 3,416,893 | 12/1968 | Parish et al. .................... 423/416 |
| 3,764,661 | 10/1973 | Kanazawa et al. ............. 423/416 |
| 3,856,925 | 12/1974 | Kodera et al. .................. 423/416 |
| 4,347,163 | 8/1982 | Shaw et al. ..................... 252/435 |

Primary Examiner—Edward J. Meros
Assistant Examiner—Wayne A. Langel
Attorney, Agent, or Firm—John E. Miller; Larry W. Evans

[57] ABSTRACT

Hydrogen and carbonyl sulfide are produced by a process comprising contacting gaseous hydrogen sulfide with gaseous carbon monoxide in the presence of a metal boride, carbide, nitride and/or silicide catalyst, such as titanium carbide, vanadium boride, manganese nitride or molybdenum silicide.

20 Claims, No Drawings

PROCESS FOR THE PRODUCTION OF HYDROGEN AND CARBONYL SULFIDE FROM HYDROGEN SULFIDE AND CARBON MONOXIDE USING A METAL BORIDE, NITRIDE, CARBIDE AND/OR SILICIDE CATALYST

BACKGROUND OF THE INVENTION

1. Field of the Invention

This invention relates to the production of hydrogen. In one aspect, the invention relates to the production of hydrogen from the reaction of hydrogen sulfide and carbon monoxide while in another aspect, the invention relates to conducting this reaction in the presence of various metal boride, nitride, carbide and/or silicide catalysts.

2. Description of the Prior Art

Hydrogen is a valuable resource as both a fuel source and chemical feedstock and as such, its production has received much attention from the chemical industry. Presently, the dominant industrial method of production is the reaction of steam with natural gas (steam reforming) although various other methods are known. Of these other methods, one that is of particular interest is the oxidation of hydrogen sulfide with carbon monoxide to produce hydrogen and carbonyl sulfide.

This reaction is of particular interest for several reasons, one of which is that hydrogen sulfide is a relatively inexpensive material and is available in large quantities from the desulfurization of fossil fuels and sour natural gas deposits. Presently this material is considered more of a waste problem than a feedstock and is typically oxidized by the Claus process to water and elemental sulfur.

Another reason for the interest in this reaction is that it can be combined with other reactions to form various thermochemical cycles, such as

  (a)

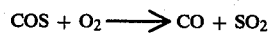  (b)

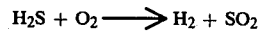  (c)

The second step, which enables the recycle of relatively expensive carbon monoxide, makes this thermochemical cycle economically attractive. In effect, hydrogen sulfide is combusted to hydrogen and sulfur dioxide, the latter being a useful resource in the manufacture of sulfuric acid.

While the reaction of hydrogen sulfide and carbon monoxide to produce hydrogen and carbonyl sulfide is known, few catalysts have been identified as useful for promoting it. Fukuda et al. describe in several publications the use of various metal sulfides, e.g., titanium disulfide, zinc sulfide, copper sulfide, nickel sulfide, etc. See U.S. Pat. No. 3,856,925; *Journal of Catalysts*, 49, 379 (1977); and *Bulletin of Chemistry for Japan*, 51, 150 (1978). However, since these disclosures describe relatively few catalysts, there is a continuing interest in identifying new catalysts for this reaction.

Various metal borides, nitrides, carbides and silicides are known in the art. See for example U.S. Pat. Nos. 4,101,592 and 3,839,225. However, these types of materials are disclosed as useful as supports for other materials or as hydrogenation-dehydrogenation catalysts. Other uses of these materials include catalysts for reactions involving carbon monoxide and hydrogen (U.S. Pat. Nos. 4,071,473 and 2,539,414), electrodes (U.S. Pat. Nos. 3,756,860 and 3,902,917), catalysts for various olefin reactions (U.S. Pat. Nos. 2,710,854 and 4,302,613), and as oxidation catalysts (U.S. Pat. Nos. 4,127,603 and 3,629,151).

SUMMARY OF THE INVENTION

According to this invention, hydrogen and carbonyl sulfide are produced by a process comprising contacting gaseous hydrogen sulfide with gaseous carbon monoxide in the presence of a catalytic amount of a composition of the formula:

$$M_{1-3}M'_{1-2} \qquad (I)$$

where
M is at least one of Ti, Zr, Hf, V, Nb, Ta, Cr, Mo, W, Mn, Fe and Co; and
M' is at least one of B, N, C and Si.

The use of these catalysts in this reaction results in superior reactant conversion and product selectivity.

DETAILED DESCRIPTION OF THE INVENTION

Catalysts:

As expressed by formula I, the catalytic composition of this invention is at least a two elemental material, i.e. a material containing at least one metal element M and at least one non-metal element M', both present in their designated, proportional amounts. Preferred catalysts are those where M is at least one of Mo, V, W and Cr and M' is B or C.

As is also evident from formula I, both M and M' can be combinations of two or more elements, e.g. M can be a combination of titanium and zirconium. In such instances, the subscript value represents the sum of the elements (e.g. for M, the sum of the subscript values for titanium and zirconium is a number of about 1–3).

The catalytic compositions of this invention can be used either in the 100 percent active form or in a diluted form and can be either supported or unsupported. Suitable support materials include silica, titania, alumina, silica-alumina, zirconia, silicon carbide, various phosphates, etc., with the aluminas and silica-aluminas preferred. If a support is used, the catalytic composition is generally present in an amount of at least about 1 weight percent, based on the combined weight of the support and the catalytic composition, preferably in an amount of at least about 10 weight percent.

Many of the catalytic compositions of formula I are available commercially. However, these materials are readily prepared by any one of a number of different methods, the particular method employed being a matter of convenience. One typical method of preparation involves reaction of the appropriate metal(s) in either the elemental or oxide form with a boron, carbon, nitrogen or silicon source at high temperature, e.g. for metal nitrides, the metal is heated to a temperature between about 1100°–1200° C. in a stream of ammonia. In another method, the catalyst can be prepared in solution by co-reducing a metal halide and an appropriate boron, carbon, nitrogen or silicon source, such as carbon tetrachloride as a source for carbon. In yet another method, the corporate metal(s) can be impregnated into a support, such as alumina, silica or silica-alumina, and then generated in situ by passing a boron, carbon, nitrogen or silicon source, such as ammonia as a source for nitrogen, over the impregnated support. These catalysts can also be coated onto a support. Other methods of preparation are known in the art and include such techniques as the use of nonaqueous or mixtures of nonaqueous and aqueous solvent or slurry media, pH adjustment of the catalyst precursor solution or slurry, multiple impregnations, coatings and/or calcination steps, etc.

In one embodiment of this invention, the catalyst is sulfided after it has been prepared. This can be accomplished at a temperature between about 100°–800° C., preferably between about 200° and about 400° C. and at a pressure between 0 and about 150 atmospheres, preferably between about 0 and about 100 atmospheres. The sulfiding can last from less than one hour to more than 24 hours with a typical sulfiding time of between about 0.5 and about 2 hours. Hydrogen sulfide is a preferred sulfiding agent but others, such as various mercaptans (e.g. methyl mercaptan) can be used. The sulfiding can be done either neat or diluted, e.g. with such diluents as carbon monoxide. Preferably, the catalytic compositions are sulfided in situ with the feed and/or product stream of the process. The exact amount of sulfur incorporated into the catalyst is difficult to determine and is subject to change over the course of the reaction.

Reaction:

As stated earlier, the reaction of carbon monoxide with hydrogen sulfide to form carbonyl sulfide and hydrogen is a known vapor phase reaction and is described in such references as U.S. Pat. No. 3,856,925 and Fukuda et al., *Journal of Catalysis*, 49, 379 (1977). The reaction is typically conducted within a temperature range of 50°–800° C., preferably 200°–500° C., and within a pressure range of 0–500 psig, preferably 0–300 psig. Stoichiometric amounts of reactants are required although preferably an excess of hydrogen sulfide is present as a means of shifting the equilibrium to the right. The reaction can be conducted in any vapor phase reactor including the various fixed-/and fluid-bed configurations and the contact time of the reactants over the catalyst bed will vary with the other process parameters. Typically a contact time of about 1 to about 2 seconds, preferably 3 to about 10 seconds is employed in a fixed-bed reactor. The catalysts of this invention can be used alone, in combination with one another and/or in combination with other catalysts, such as those disclosed by Fukuda et al., supra.

The products of this process are hydrogen, carbonyl sulfide and minor amounts of other compounds, primarily methane and carbon dioxide. Hydrogen and carbonyl sulfide are the desired products, the former to be ultimately recovered and the latter a useful intermediate in various thermochemical cycles in which this reaction is but one step.

The following examples are illustrative embodiments of this invention. Unless indicated to the contrary, all parts and percentages are by weight.

SPECIFIC EMBODIMENTS

Catalyst Preparation:

The catalyst of example 8 in the Table was prepared by the following procedure. The other catalysts reported in this Table were prepared by a similar procedure. Unless indicated to the contrary, all metal carbides, borides, nitrides and silicides reported in the Table were commercially obtained.

One-eighth inch Alundum ® spheres (21 cc, SA-5209 obtained from Norton Company) were coated with molybdenum carbide, $Mo_2C$, (1.88 g) by wetting the spheres with chloroform (about 2 ml) and applying the molybdenum carbide in four equal portions. The spheres were rolled for 15 minutes on a roller mill in small vials between each addition of the catalyst (i.e. molybdenum carbide). The coated spheres were placed in a glass tube (0.75" internal diameter, catalyst bed 10" long) and held in place with glass wool plugs. A stream of hydrogen sulfide:carbon monoxide at a molar ratio of 1:1 was passed over the coated catalyst at 250° C. with a total flow of 40 cc per minute.

Procedure and Conditions:

Unless otherwise noted, the reactions were conducted in the glass tube used to condition the catalyst as described in the preceding paragraph. Following this pretreatment, the temperature was increased to 400° C. and the hydrogen sulfide:carbon monoxide stream continued to flow through the reactor at a rate that established a 10 second contact time of reactants over the catalyst bed. The off-gas rate was measured with a soap-film meter and the off-gas composition was determined after one hour of on-stream activity with the aid of a Carle 111 gas chromatograph equipped with a 158-b column system. Reject gases were scrubbed in a monoethanolamine/water solution and then vented to the hood. The reaction temperature of each example was approximately 400° C. and the tube was heated by means of a Lindberg tube furnace. The reactant gases were introduced into the tube from tanks through stainless steel tubing, regulators, flow controllers, and rotometers. The gases were purchased from the Matheson Gas Company and used without further purification.

The percent conversion as reported in the Table was calculated by subtracting the amount of hydrogen sulfide leaving the reactor from the amount of hydrogen sulfide fed to the reactor and dividing the difference by the amount of hydrogen sulfide fed to the reactor and then multiplying the quotient by 100. The ratio of hydrogen to carbon dioxide as calculated by simple dividing the hydrogen recovered (in mole percent) by the carbon dioxide recovered (also in mole percent) and reporting the quotient. The higher the quotient, the better the selectivity. Although not reported in the Table, for each mole of hydrogen produced, one mole of carbonyl sulfide was also produced.

TABLE

REACTION OF HYDROGEN SULFIDE AND CARBON MONOXIDE IN THE PRESENCE OF VARIOUS METAL CARBIDE, BORIDE, NITRIDE AND SILICIDE CATALYSTS

| Example | Catalyst | $H_2S$ Conversion (%) | $H_2/CO_2$ |
|---|---|---|---|
| 1 | TiC | 10 | 6 |
| 2 | ZrC | 6 | 9 |
| 3 | HfC | 1 | * |
| 4 | VC | 19 | 17 |
| 5 | NbC | 7 | 10 |
| 6 | TaC | 2 | 5 |
| 7 | $Cr_3C_2$ | 16 | 14 |
| 8 | $Mo_2C$ | 20 | 19 |
| 9 | WC | 15 | 10 |
| 10 | $TiB_2$ | 1 | * |
| 11 | $VB_2$ | 5.0 | 75 |
| 12 | CrB | 11.6 | 14 |
| 13 | $CrB_2$ | 8.6 | 43 |
| 14 | MoB | 10.0 | 75 |
| 15 | $MoB_2$ | 19.8 | 75 |
| 16 | $WB-W_2B$ | 6.4 | 75 |
| 17 | VN | 12.2 | 20 |
| 18 | CrN | 14.0 | 75 |

TABLE-continued

REACTION OF HYDROGEN SULFIDE AND CARBON MONOXIDE IN THE PRESENCE OF VARIOUS METAL CARBIDE, BORIDE, NITRIDE AND SILICIDE CATALYSTS

| Example | Catalyst | $H_2S$ Conversion (%) | $H_2/CO_2$ |
|---|---|---|---|
| 19 | $W_2N$—WN | 22.2 | 56 |
| 20 | VSi | 9.4 | 24 |
| 21 | CrSi | 12.4 | 8 |
| 22 | $MoSi_2$ | 4.6 | 8 |

*No $CO_2$ was detected in the product gas.

Although the preceding examples describe this invention in considerable detail, the purpose of this detail is for illustration only and is not to be construed as a limitation upon the invention as described in the specification or following claims.

What is claimed is:

1. A process for the production of hydrogen and carbonyl sulfide, the process comprising contacting gaseous hydrogen sulfide with gaseous carbon monoxide in the presence of a boride, nitride, carbide or silicide catalyst of the formula $$M_{1-3}M'_{1-2} \qquad (I)$$

wherein

M is at least one of Ti, Zr, Hf, V, Nb, Ta, Cr, Mo, W, Mn, Fe and Co; and

M' is at least one of B, N, C and Si.

2. The process of claim 1 where M is at least one of molybdenum, vanadium, tungsten and chromium.

3. The process of claim 1 where M' is boron or carbon.

4. The process of claim 2 where M' is boron or carbon.

5. The process of claim 1 where the composition of formula I is used in combination with a support.

6. The process of claim 4 where the composition of formula I is used in combination with a support.

7. The process of claim 5 where the support is an alumina or a silica-alumina.

8. The process of claim 6 where the support is an alumina or a silica-alumina.

9. The process of claim 5 where the composition of formula I is present in an amount of at least about 1 weight percent, based on the combined weight of the support and the composition.

10. The process of claim 8 where the composition of formula I is present in an amount at least about 1 weight percent, based on the combined weight of the support and the composition.

11. The process of claim 1 where the composition of formula I is sulfided.

12. The process of claim 6 where the composition of formula I is sulfided.

13. The process of claim 10 where the composition of formula I is sulfided.

14. The process of claim 1 where the hydrogen sulfide and carbon monoxide are contacted at a temperature between about 50°–800° C. and a pressure between about 0–500 psig.

15. The process of claim 4 where the hydrogen sulfide and carbon monoxide are contacted at a temperature between about 50°–800° C. and a pressure between about 0–500 psig.

16. The process of claim 5 where the hydrogen sulfide and carbon monoxide are contacted at a temperature between about 50°–800° C. and a pressure between about 0–500 psig.

17. The process of claim 9 where the hydrogen sulfide and carbon monoxide are contacted at a temperature between about 50°–800° C. and a pressure between about 0–500 psig.

18. The process of claim 14 where the composition of formula I is present as a fixed-bed and the contact time of the hydrogen sulfide and carbon monoxide with the composition is between about 1–20 seconds.

19. The process of claim 15 where the composition of formula I is present as a fixed-bed and the contact time of the hydrogen sulfide and carbon monoxide with the composition is between about 1–20 seconds.

20. The process of claim 17 where the composition of formula I is present as a fixed-bed and the contact time of the hydrogen sulfide and carbon monoxide with the composition is between about 1–20 seconds.

* * * * *